Aug. 23, 1966    G. L. JAMES    3,268,678
ADJUSTABLE TIRE PRESSURE SENSING SWITCH WHICH
IS EASILY TESTED FOR PROPER OPERATION
Filed Nov. 18, 1963
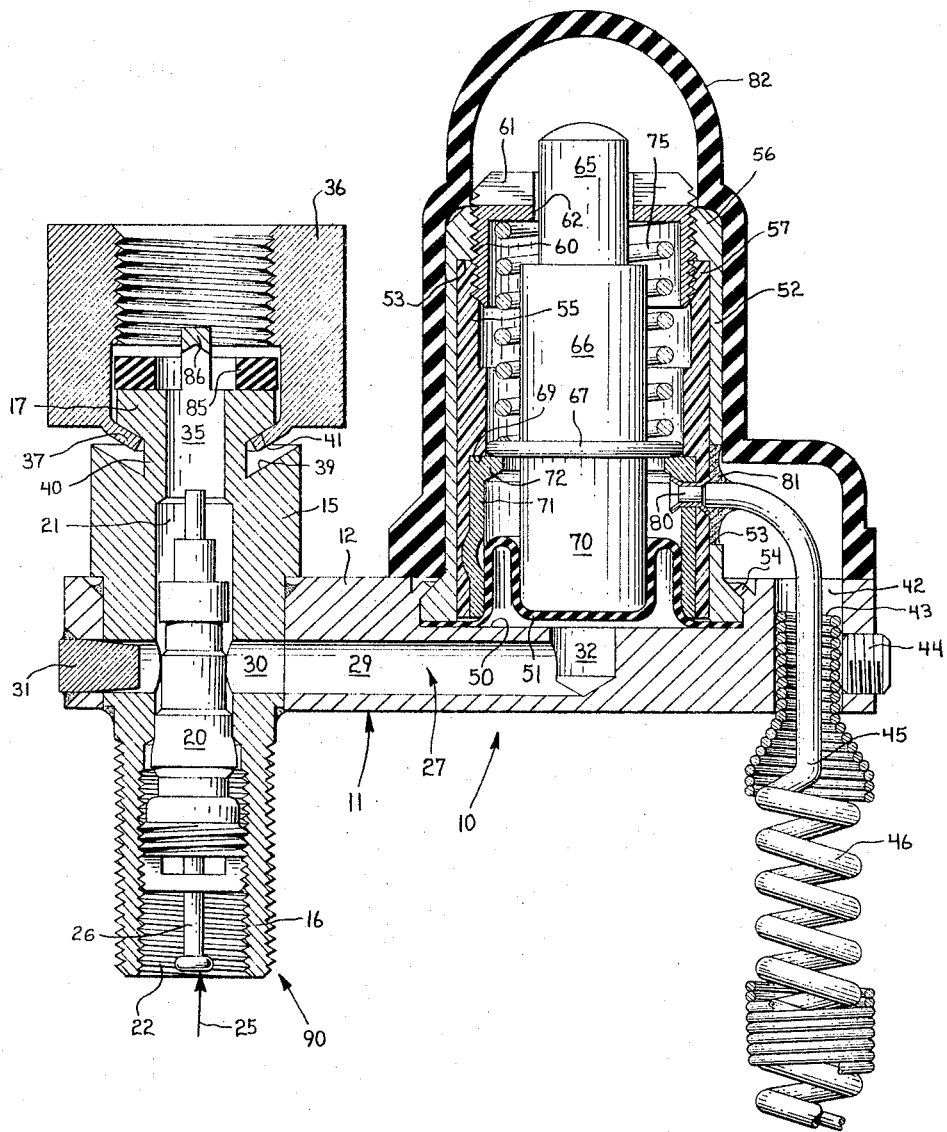
INVENTOR.
GENE L. JAMES
BY
*Lockwood, Woodard, Smith & Weikart*
Attorneys United States Patent Office 3,268,678
Patented August 23, 1966

1

3,268,678
ADJUSTABLE TIRE PRESSURE SENSING SWITCH WHICH IS EASILY TESTED FOR PROPER OPERATION
Gene L. James, Champaign, Ill., assignor to The Magnavox Company, Fort Wayne, Ind., a corporation of Indiana
Filed Nov. 18, 1963, Ser. No. 324,284
6 Claims. (Cl. 200—61.22)

The present invention relates to a pressure operated electrical switch arrangement finding important utility in an alarm system for continuous monitoring of truck tire pressure, said switch arrangement being usable in the tire alarm system disclosed in Harold M. Brown et al. application, S.N. 162,857, assigned to the same assignee as the present application.

Although the switch arrangement disclosed in the above mentioned application has been found to operate in excellent fashion, it has been found that the switch structure of the application includes certain undesirable features and produces certain disadvantages. For example, in order to increase the tire pressure, either the electrical connection to the switch structure must be removed from the switch structure or the entire switch structure must be removed from the tire valve. If the electrical connection is removed, there is likelihood that the filling station attendant, truck driver or other attendant, whose hands are not usually spotless, cannot prevent dirt entering into the protective boot and possibly interfering with the electrical connection. Also, the time and effort involved in removing the entire switch assembly is preferably avoided if possible.

Consequently, an important object of the present invention is to provide a pressure responsive electrical switch arrangement incorporating a pressure tap which is just as accessible as a conventional tire pressure tap having no associated pressure sensing mechanism thereon.

A further object of the present invention is to provide an electrical switch arrangement which is easily and quickly checked to determine whether the switch is operable and to determine whether all mechanical parts of the arrangement will actually move exactly as they move in actual operation.

Still another object of the present invention is to provide an electrical switch arrangement incorporating means for reducing stress on the electrical lead to the switch, said means also being usable as an electrical ground for the arrangement.

Another object of the present invention is to provide an electrical switch arrangement incorporating built-in, inexpensive die means for attaching a swivel nut to said arrangement, said means making possible a less expensive and more compact or shorter switch.

Still a further object of the present invention is to provide a pressure responsive electrical switch arrangement incorporating automatic means for flushing out or cleaning the passages and orifices of the arrangement.

Another object of the present invention is to provide a pressure responsive switch device incorporating easily adjustable means for changing the pressure at which the switch opens and closes.

Related objects and advantages will become apparent as the description proceeds.

One embodiment of the present invention might include an electrical switch arrangement responsive to an abnormal pressure condition in a tire, said switch arrangement including a body structure having a portion securable to a pressure tap, said body structure defining a further pressure tap and having a first passage between said portion and said further pressure tap, a piston mounted on the body structure and having a portion in electrical

2 contact with said body structure, a diaphragm acting between said body structure and said piston. The body structure has a second passage in communication with the first passage and opening beneath the diaphragm. A valve is provided in the first passage and normally seals off the further pressure tap but is operable to permit flow through said passage and further pressure tap. The diaphragm is movable under the pressure of said further passage to move the piston to break electrical contact between the piston and body structure.

The full nature of the invention will be understood from the accompanying drawing and the following description and claims.

The figure is a section partially in elevation and taken through the switch arrangement of the present invention.

Referring now more particularly to the drawing, there is illustrated a pressure responsive electrical switch arrangement 10 including a body structure 11 made up of a base-block 12 and an elongated generally tubular member 15 welded thereto. The member 15 is threaded both internally and externally at one end 16 and has an enlarged head 17 formed on the other end thereof. A conventional valve structure 20 is threadedly mounted upon the member 15 so as to extend within a passage 21 extending through the length of the member 15.

The valve 20 is entirely conventional in construction and operation and can be found in any conventional truck tire or, for that matter, automobile tire. The function of the valve 20 is to control the flow of air into and out of the passage 21 from the end 22 of that passage. Normally the valve 20 is closed. However, it may be opened by pressure exerted in the direction of the arrow 25 against the projection 26.

A second passage 27 is formed in the body structure 11 by means of bores 29 and 30 which extend through the base block 12 and through the elongated member 15, respectively, and which are closed against the outward flow of air pressure at one end by plug 31 which is welded in block 12. A further bore 32 is formed in the base block 12 and intersects the bore 30 to complete the passage 27. It can be seen that pressure within the portion of the passage 21 between the valve and the end 35 of the passage will be communicated to the passage 27.

One important feature of the invention is the swivel nut 36 mounting on the member 15. This mounting is effected by inwardly projecting flange means 37 which extend toward and surround a neck 40 joining the enlarged head 17 to the member 15. The member 15 has formed thereon a frusto-conical tapered surface 39 which is generally parallel to the surface 41 of the head and which defines a tapered recess in the member 15. In securing the swivel nut 36 to the member 15, a closure die forces the flange means 37 inwardly to the illustrated position and is guided by the frusto-conical surface 39. It can be seen that the swivel nut 36 has sufficient clearance to easily rotate about the enlarged head but is spaced sufficiently close to the neck 40 in order to prevent the axis of the member 15 from canting to any appreciable angle relative to the axis of the nut 36.

The nut 36 is used to secure the switch assembly 10 to the valve or pressure tap of a truck tire. Such tire valves or pressure taps conventionally extend horizontally. Consequently, when the switch arrangement or assembly of the present invention is mounted on the tire valve, certain operating parts in the arrangement are not affected by centrifugal force. This is true because those parts also always extend horizontally in the direction of their operational movement as will become evident below.

The base block 12 is formed with an aperture 42 which receives a tightly wound spring 43. That is, the spring 43 is wound in such a manner as to have an inherent stress urging the loops of the helix or spiral toward one another. The spring 43, which is secured in place by setscrew 44, functions to provide an electrical ground for the body structure 11 and to reduce mechanical stress on the electrical lead or cord 45 of the device. The spring 43 houses the electrical lead 45 and extends with the electrical lead 45 to the associated transmitter structure described in the above mentioned copending application.

The electrical cord 45 is insulated and has a helical configuration at 46, this helical shape being produced in the same manner as in the manufacture of coiled telephone cords. Formed in the base block 12 is a generally cylindrical recess 50. A diaphragm 51 is received within the recess and is fixed in sealed relation against the bottom of the recess at the periphery thereof by an outer housing 52 which is "staked" in the illustrated position (see tabs 54) by conventional manufacturing apparatus. The outer housing 52 is formed of electrically conductive material and is bored out to receive an inner housing 55 of electrically non-conductive material. It can be appreciated that the sealing compound 81 adhering to surface of 55 and projecting through hole 53 of the outer housing 52 retains the inner housing fixed in the illustrated position.

At the distal end 56 of the outer housing and the distal end 57 of the inner housing, internal threads 60 are provided for reception of an electrically conductive nut 61. The nut 61 has a central aperture 62 which reciprocally receives the reduced diameter end 65 of a piston 66 formed of electrically conductive material. The piston 66 has an outwardly projecting annular portion 67 which is slidably received within the non-conductive inner housing 55 and which, along with the reduced diameter portion 65 and the nut 61, function to guide the piston and to maintain it in coaxial relation with the housings 55 and 56. Thus, the end portion 70 of the piston 66 is maintained in spaced relation to an electrically conductive annular member 71 retained in position by a shoulder 69 of the inner housing 55.

The member 71 is formed with an inwardly projecting flange 72 against which the outwardly projecting portion 67 of the piston 66 is yieldably retained by a spring 75 formed of electrically conductive material. The spring 75 acts between the nut 61 and the ring 67 to hold the ring in electrical contact with the member 71. The lead 46 is electrically connected at 80 to the member 71 and extends through suitable openings in the nonconductive housing 55 and conductive housing 52. The opening 53 in the housing 52 is relatively large so that there is no short between the housing 52 and the lead 45. Insulating sealing compound 81 is received in the opening 53 and functions to maintain the cord or lead in proper position. Over the housing 52 and the lead 45, there is received a rubber boot 82.

The swivel nut 36 is used for attaching the member 15 to the pressure tap of a tire. When the attachment is made, pressure tap engages the resilient washer 85 which is adhered to the enlarged head 17. A central projection 86 engages the valve of the tire pressure tap and opens it so that the air pressure within the tire is the same as the pressure within the passage 21. The washer 85, of course, prevents leakage of pressure out of the nut 36. Since the passage 27 is in communication with the passage 21, the diaphragm 51 senses and reacts to pressure within the tire. Alternatively the pressure tap or valve structure of the tire can be removed and replaced by the nut 36 and tubular member.

Assuming that pressure is above the desired value, the diaphragm will be forced upwardly to raise the piston 66 and to move the projecting portion 67 away from the flange 72 of the member 71, thus breaking the electrical connection between these members. The amount of pressure necessary to break this electrical connection can be varied by adjusting the position of the nut 61.

If the nut 61 is unscrewed upwardly, the pressure required in passage 27 to raise the piston is less, and if screwed downwardly, the pressure required is greater.

From the above description, it should be clear that the present invention provides a pressure responsive electrical switch arrangement which incorporates a pressure tap 90 which is just as accessible as the conventional tire pressure tap having no associated pressure-sensing mechanism thereon. It should also be mentioned that the present arrangement is easily and quickly checked to determine whether the switch is operable and to determine whether all mechanical parts of the arrangement will actually move exactly as they move in actual operation. Such checking is accomplished by, for example, using the thumb to depress the piston 66. Assume that the piston is positioned upwardly of the illustrated position and out of contact with the member 71. When the thumb is used to press down the boot 82 and the piston 66, the projecting portion 67 engages the conductive member 71 closing the switch contact and causing the alarm to sound. This is precisely the same mechanical operation as occurs when the pressure within the tire falls below a predetermined value. Furthermore, the position assumed by the diaphragm 51 under such thumb pressure is precisely that which it assumes when there is a low tire pressure.

It will also be evident that the present arrangement incorporates means for reducing stress on the electrical lead to the switch, this means being the spring 43 which encases the electrical lead. As pointed out, the built-in, inexpensive die means 40 permits easy, inexpensive attachment of the swivel nut to the member 15. This built-in die arrangement also makes possible a shorter switch and more particularly a shorter tubular member-nut combination, since the attachment of the nut is accomplished in less of the length of the member 15.

It should also be noted that the pressure responsive switch of the present invention incorporates automatic means for flushing out or cleaning the pressure passages 21 and 27. This automatic means is operated by either opening the valve 20 to atmosphere in which case air pressure is reduced in the air passage 27 so that the diaphragm 51 moves toward the passage 27 and blows out the passage. Alternatively, an air pressure supply can be attached to the pressure tap 90 and the valve opened thereby causing the pressure within the passages 21 and 27 to greatly increase whereby air passes through the passage 27 and into the area beneath the diaphragm 51 blowing out the passage 27. Of course, the much greater flow of air through the passage 21 either into the tire or out of the tire always insures that the passage 21 is cleared and flushed out.

A further advantage of the present invention is the built-in thermal compensation feature of the switch. Thus, the diaphragm 51 is formed of a conventional plastic material which stiffens as the temperature drops and becomes more flexible as the temperature increases. Consequently, the pressure required to break the electrical contact and sound the alarm is greater at low temperatures than at high temperatures.

The invention claimed is:

1. An electrical switch responsive to an abnormal pressure and comprising: a body structure having a portion securable to a pressure tap, said body structure defining a further pressure tap and having a first passage between said portion and further pressure tap, a piston mounted on said body structure and having a portion in electrical contact with a second portion of said body structure, a diaphragm acting between said body structure and said piston, said body structure having a second passage in communication with said first passage and opening beneath said diaphragm, a valve in said first passage normally sealing off said further pressure tap but operable to permit flow through said first passage and further pressure tap, said diaphragm being movable under pressure in said first passage to move said piston to break electrical contact between said piston and body structure, said piston projecting out of said body structure, and a flexible nonconductive boot mounted on said body structure and covering said piston.

2. An electrical switch responsive to an abnormal pressure and comprising: a body structure having a portion securable to a pressure tap, said body structure defining a further pressure tap and having a first passage between said portion and further pressure tap, a piston mounted on said body structure and having a portion in electrical contact with a second portion of said body structure, a diaphragm acting between said body structure and said piston, said body structure having a second passage in communication with said first passage and opening beneath said diaphragm, a valve in said first passage normally sealing off said further pressure tap but operable to permit flow through said passage and further pressure tap, said diaphragm being movable under pressure in said further passage to move said piston to break electrical contact between said piston and body structure, a nut threaded into said body structure, spring means acting between said nut and said piston to urge said piston into electrical contact with said body structure, said nut being adjustable to vary the spring force acting on said piston and to thereby vary the pressure required to break electrical contact between said piston and body structure.

3. An electrical switch responsive to an abnormal pressure and comprising: a body structure having an enlarged head portion, a swivel nut secured to said body structure about said enlarged head portion for securing said head portion to a pressure tap, said body structure defining a further pressure tap and having a first passage between said portion and further pressure tap, a piston mounted on said body structure and having a portion in electrical contact with a second portion of said body structure, a diaphragm acting between said body structure and said piston, said body structure having a second passage in communication with said first passage and opening beneath said diaphragm, a valve in said first passage normally sealing off said further pressure tap but operable to permit flow through said passage and further pressure tap, said diaphragm being movable under pressure in said further passage to move said piston to break electrical contact between said piston and said second portion of said body structure, an electrical lead secured to said second portion, said electrical lead having a helical shape along a portion of its length, and a tightly wound spring secured to said body structure and housing said electrical lead.

4. An electrical switch arrangement responsive to an abnormal pressure condition in a tire, said switch arrangement comprising: a body structure having a first passage therethrough and an enlarged head through which one end of said passage opens, a swivel nut secured to said body structure about said enlarged head, said body structure having a resilient washer adhered to said enlarged head and surrounding said passage opening whereby said body structure is securable to a pressure tap with said passage in communication with the pressure tap, said body structure having a frusto-conical tapered recessed surface generally parallel to the enlarged head and which acts as a die for securing said swivel nut to said enlarged head;
    said body structure being formed to define a further pressure tap at which the other end of said passage opens;
    a valve in said body structure controlling flow through said pressure tap to or from said passage, said valve being normally closed but operable to open position;
    said body structure having a further passage communicating with said first passage between said valve and said one end of said passage;
    an outer cylindrical housing formed of electrically conductive material and fixed to said body structure;
    an inner cylindrical housing formed of electrically non-conductive material and retained within said outer housing;
    an annular member with an inwardly projecting flange on its upper end, said annular member being electrically conductive and retained within said housing at the lower end thereof;
    an electrically conductive piston reciprocal within said cylinders and annular member, said piston having a radially outwardly projecting annular projection which engages and is guided by said inner housing;
    said further passage having one end opening within the proximal ends of said housing;
    a diaphragm secured to said body structure by said housings and covering said one end of said further passage, said diaphragm engaging the lower end of said piston whereby said flange and projection are separable by pressure above a predetermined value in said further passage.

5. An electrical switch arrangement responsive to an abnormal pressure condition in a tire, said switch arrangement comprising: a body structure having a first passage therethrough and an enlarged head through which one end of said passage opens, a swivel nut secured to said body structure about said enlarged head whereby said body structure is securable to a pressure tap with said passage in communication with the pressure tap;
    said body structure being formed to define a further pressure tap at which the other end of said passage opens;
    a valve in said body structure controlling flow through said pressure tap to or from said passage, said valve being normally closed but operable to open position;
    said body structure having a further passage communicating with said first passage between said valve and said one end of said first passage;
    an outer cylindrical housing formed of electrically conductive material and affixed to said body structure;
    an inner cylindrical housing formed of electrically nonconductive material and retained within said outer housing;
    an annular member with an inwardly projecting flange on its upper end, said annular member being electrically conductive and retained within said inner housing at the lower end thereof;
    an electrically conductive piston reciprocal within said housings and annular member, said piston having a radially outwardly projecting annular projection which engages and is guided by said inner housing;
    an electrically conductive nut threaded into the distal ends of said housings;
    an electrically conductive spring received within said housings and acting between said nut and said projection to yieldably hold said piston in engagement with said flange;
    said further passage having one end opening within the proximal ends of said housings;
    a diaphragm secured to said body structure by said housings and covering said one end of said further passage, said diaphragm engaging the lower end of said piston whereby said flange and projection are separable by pressure above a predetermined value in said further passage.

6. An electrical switch arrangement responsive to an abnormal pressure condition in a tire, said switch arrangement comprising: a body structure having a first passage therethrough and an enlarged head through which one end of said passage opens, a swivel nut secured to said body structure about said enlarged head, said body structure having a resilient washer adhered to said enlarged head and surrounding said passage opening whereby said body structure is securable to a pressure tap with said passage in communication with the pressure tap, said body structure having a frusto-conical tapered recessed surface generally parallel to the enlarged head and which acts as a die for securing said swivel nut to said enlarged head;

said body structure being formed to define a further pressure tap at which the other end of said passage opens;

a valve in said body structure controlling flow through said pressure tap to or from said passage, said valve being normally closed but operable to open position;

said body structure having a further passage communicating with said first passage between said valve and said one end of said passage;

an outer cylindrical housing formed of electrically conductive material and affixed to said body structure;

an inner cylindrical housing formed of electrically non-conductive material and retained within said outer housing;

an annular member with an inwardly projecting flange on its upper end, said annular member being electrically conductive and retained within said housing at the lower end thereof;

an electrically conductive piston reciprocal within said housings and annular member, said piston having a radially outwardly projecting annular projection which engages and is guided by said inner housing;

an electrically conductive nut threaded into the distal ends of said housings;

an electrically conductive spring received within said housings and acting between said nut and said projection to yieldably hold said piston in engagement with said flange;

said further passage having one end opening within the proximal ends of said housings;

a diaphragm secured to said body structure by said housings and covering said one end of said further passage, said diaphragm engaging the lower end of said piston whereby said flange and projection are separable by pressure above a predetermined value in said further passage;

an electrical lead secured to said annular member, said electrical lead having a helical shape along a portion of its length;

and a tightly wound spring secured to said body structure and housing said electrical lead.

References Cited by the Examiner
UNITED STATES PATENTS

| | | | |
|---|---|---|---|
| 1,734,605 | 11/1929 | Smith | 174—69 |
| 2,040,554 | 5/1936 | Holmes | 200—61.25 |
| 2,296,411 | 9/1942 | Wills | 200—61.25 |
| 2,727,221 | 12/1955 | Sprigg | 200—61.25 |
| 2,908,779 | 10/1959 | Jacobs | 200—61.25 |
| 3,145,689 | 8/1964 | O'Neal | 340—58 X |

BERNARD A. GILHEANY, *Primary Examiner.*

R. N. ENVALL, JR., *Assistant Examiner.*